United States Patent [19]
Von Wimmersperg

[11] 3,833,946
[45] Sept. 10, 1974

[54] VEHICLE CAR BED FOR INFANTS

[76] Inventor: Heinrich F. Von Wimmersperg, 15929 Grand River Ave., Detroit, Mich. 48227

[22] Filed: Oct. 12, 1972

[21] Appl. No.: 296,898

[52] U.S. Cl. .......................... 5/94, 297/216, 297/386
[51] Int. Cl. .............................................. A47d 7/04
[58] Field of Search .......... 5/94, 101; 297/386, 390, 297/216, 231, 250, 254

[56] References Cited
UNITED STATES PATENTS

| | | | |
|---|---|---|---|
| 2,664,140 | 12/1953 | Kindelberger | 297/231 |
| 2,676,336 | 4/1954 | Gilmer | 5/94 |
| 2,777,502 | 1/1957 | Travis | 297/386 |
| 3,159,850 | 12/1964 | Aldrich et al. | 5/94 |
| 3,361,475 | 1/1968 | Villiers | 297/386 |
| 3,381,315 | 5/1968 | Glassberg | 297/390 |
| 3,579,673 | 5/1971 | Hirschey | 5/94 |

Primary Examiner—Paul R. Gilliam
Assistant Examiner—Darrell Marquette
Attorney, Agent, or Firm—Barnes, Kisselle, Raisch & Choate

[57] ABSTRACT

A vehicle car bed for infants adapted to be secured on a vehicle seat by a conventional seat belt. The bed is designed to be positioned so that it extends crosswise of the vehicle and is provided at each end with links or brackets for connection with the seat belt and secured to the bed such that the pull exerted on the bed by the seat belt in the event of sudden deceleration of the vehicle extends along a line spaced above the center of gravity of the bed with the infant therein so that the bed, or at least the bottom and front wall thereof, tilt upwardly and forwardly and absorb the impact of the infant's body over a relatively large area.

16 Claims, 17 Drawing Figures

FIG. 16

VEHICLE CAR BED FOR INFANTS

This invention relates to an infant restraining device for use in vehicles and, more particularly, to a car bed in which an infant is adapted to be supported within a vehicle for safely restraining the infant in the event of sudden deceleration or acceleration as might occur in a front end or a rear end collision.

Many infant safety restraining devices for use in vehicles are in the nature of a car seat or the like designed such that the axis of the infant's body, either in a seated or a reclined position, extends lengthwise of the vehicle in a generally vertical plane. Experience has shown that, in the event of a collision, devices of this type are frequently not effective to prevent serious injury to the infant primarily because the restraining forces are concentrated on localized portions of the infant's body, because different portions of the infant's body are accelerated or decelerated rapidly at different rates or because localized portions of the infant's body are subjected to high impact forces.

Likewise, the conventional car beds for infants, which are supported on a vehicle seat cushion, do not offer much protection to the infant in the event of a collision, even when the bed is secured to the car seat in a conventional manner by means of a seat belt. In the case of a front end collision (sudden deceleration) or a rear end collision (sudden acceleration) the infant is usually subjected to sudden high force impacts which frequently cause severe injuries and sometimes death.

The present invention has for its object the provision of a car bed for infants which is adapted to be supported on a vehicle seat and which is so designed as to minimize the danger of serious injury to an infant retained therein in the event of a collision.

More specifically, the present invention contemplates a car bed for infants in the form of a walled enclosure designed so that an infant lying therein extends crosswise of the vehicle rather than lengthwise thereof. In addition, the enclosure includes means for securing the car bed on a vehicle seat so that, in the event of a collision, at least the bottom and the forwardly facing wall of the enclosure tilt upwardly and the infant's body revolves therewith so that the impact of the infant's body is absorbed over a large area thereof by both the bottom and the forwardly facing wall of the enclosure.

In addition, the car bed of the present invention is designed so that an infant's head and torso absorb the force of impact substantially simultaneously in the event of a sudden acceleration or deceleration. This minimizes distortion or bending of the infant's body and reduces substantially entirely the likelihood of the infant's head absorbing a major portion of the impact force. If desired, the car bed of the present invention can be so designed that the major force of impact is absorbed to a larger extent by the infant's torso rather than its head, which is normally more vulnerable to serious injury.

Furthermore, the present invention is designed to provide restraining force on the infant at the very onset of a sudden acceleration or deceleration and to lower the peak impact force to which the infant is subjected.

Other objects and features of the present invention will become apparent from the following description and accompanying drawings, in which.

Figure 3:
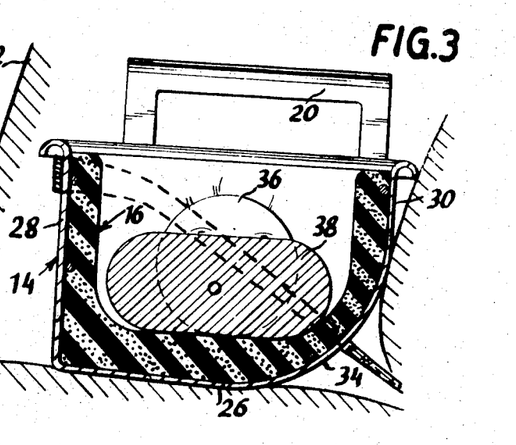
FIG. 3 is a transverse sectional view of the car bed shown in FIG. 1.
Figure 4:
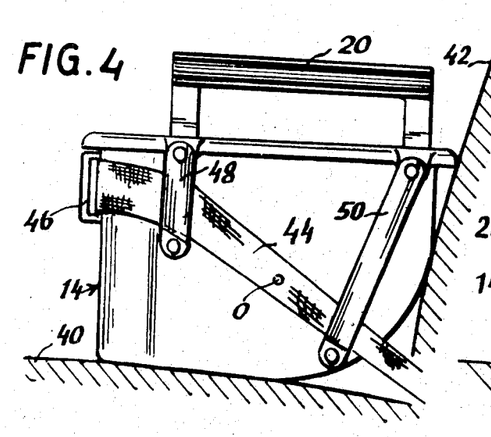
FIG. 4 is an end view thereof in the normal traveling condition.
Figure 5:
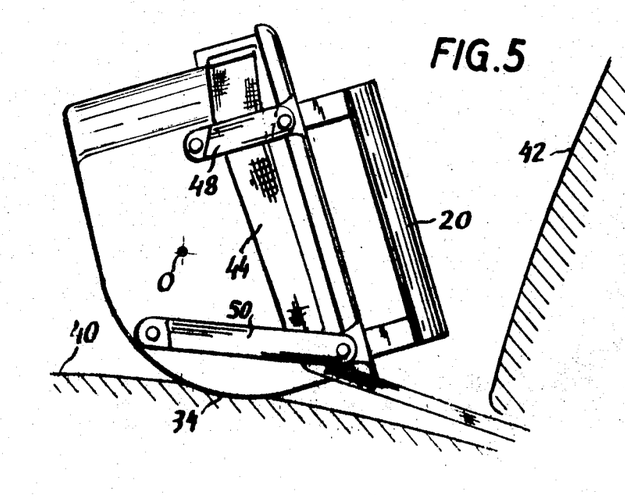
FIG. 5 is an end view of the car bed showing the position it assumes in the event of a front end collision.

Referring first to the form of infant car bed shown in FIGS. 1 through 5, the unit (generally designated 10) includes a relatively rigid frame 12, an outer shell 14 and an inner lining 16. Frame 12 includes a pair of rigid end plates 18 preferably formed of sheet metal or the like and having vertical extensions at their upper ends forming handles 20 at each end of the device. The two end plates 18 are retained in spaced apart relation by a plurality of longitudinally extending rigid rods 22 and a generally U-shaped transversely extending rod 24 which is connected to rods 22 intermediate their ends and which imparts rigidity to the structure as a whole. Outer shell 14 may be formed of any suitable rigid or semi-rigid material, such as plastic or the like. Shell 14 is shaped to enclose frame 12 and is rigidly connected thereto. Shell 14 includes a bottom wall 26, a front wall 28, a rear wall 30 and end walls 32. As shown in FIG. 3, bottom wall 26 is connected with rear wall 30 by a rounded wall section 34.

Inner liner 16 is formed of a compressible, shock-absorbing material, such as rubber or one of the other well known plastic foams. Liner 16 extends over the inner surfaces of all the walls of shell 14. Also as shown in FIG. 3, the width of the infant enclosure (that is, the dimension between the inner faces of liner 16 between the front end rear sides thereof) is preferably not substantially greater than the width of the infant. In FIG. 3 the infant's head is designated 36 and the infant's torso is designated 38.

The car bed illustrated in FIGS. 1–5 is adapted to be supported on a vehicle seat cushion 40 with the rear side thereof positioned against the vehicle seat backrest 42. The car bed is adapted to be secured to the vehicle seat by means of a conventional seat belt 44, the opposite ends of which are secured together by a conventional buckle 46. For the purpose of securing a seat belt 44 to the bed 10 two brackets 48,50 are rigidly secured to each end plate 18, such as by riveting or the like, through apertures 52 in end plates 18. Each bracket 48 is secured to the end wall of the bed adjacent the upper front portion thereof and the portion through which seat belt 44 extends is not substantially wider than the seat belt itself so that along the front side of the device the seat belt is retained in a position adjacent the upper end thereof. Each bracket 50 is secured to the end walls adjacent the rear portion thereof and has a vertical extent substantially greater than the width of seat belt 44 so as to permit tilting or pivotal movement of the unit as a whole to the position shown in FIG. 5.

When an infant is placed in the bed the center of gravity of the unit and the infant considered as a whole lies on an axis passing lengthwise through the unit at the point generally designated 0. It will be noted that the axis 0 is located substantially below brackets 48. Thus, in the event of an impact causing sudden deceleration of the vehicle, the momentum of the unit with the infant in it tends to continue in a forward direction and, accordingly, causes the bed to rotate in a clockwise direction (as viewed in FIG. 5) since the axis of the center of gravity 0 lies below the line of force applied to the unit by seat belt 44. This rotation of the unit is facilitated by the curved wall portion 34 of outer shell 14. Upon such an impact, seat belt 44 stretches to some extent and absorbs a portion of the kinetic energy of the bed and the infant therein. In addition, comparing FIGS. 3 and 5, it will be observed that as the bed tilts or rotates from the position shown in FIG. 3 to that shown in FIG. 5 the restraining forces on the infant are distributed over a large area of the infant's side, back and head and are absorbed by the portion of the compressible liner 16 which overlies bottom wall 26 and front wall 28 of shell 14. Since the head and the upper torso of the infant decelerate practically simultaneously, dangerous bending or distortion of the infant's head is avoided. Furthermore, the onset of the gradual deceleration is initiated almost immediately with the vehicle deceleration since the infant is rather closely confined by liner 16. This is important in maintaining the peak deceleration at a low value. The stretching of belt 44 also assists in lowering the peak value of deceleration.

If the infant is restrained within the car bed such as by a strap or belt 54 (FIG. 1), and this is highly recommended, in the rebound movement after impact the handles 20 on end plates 18 engage the backrest 42 before the infant's head can hit the backrest or the rear wall of the bed. This avoids the possibility of the infant's head sustaining the total rebound inertia of the unit.

In the case of a rear end collision the torso and head of the infant are impacted against liner 16 almost instantaneously; this eliminates the possibility of whiplash injury. In the case of a crash involving either side of the vehicle the infant's head as well as its legs are protected by the compressible, shock-absorbing liner 16. In addition to their function of preventing injury to an infant in the case of a rebound, handles 20 also provide a means for conveniently carrying the device. Furthermore, brackets 48,50 are designed so that the ends of belt buckle 46 can be readily slipped therethrough in order to readily remove the bed from the vehicle, particularly in the case of an emergency such as a fire or the like.

Referring now to FIGS. 6–9, the car bed shown includes a generally rigid plastic shell 56 of generally rectangular shape and generally similar in appearance to shell 14. Within shell 56 there is arranged a liner (not illustrated) which is essentially the same in shape and function as liner 16. However, in the embodiment illustrated in FIGS. 6–9 each end wall 58 of shell 56 is sandwiched between two reinforcing plates (namely, an inner plate 60 and an outer plate 62). These two plates are secured together and to each end wall 58 by a tubular rivet 64 and by a stud 66. Each end wall 58 is further reinforced by the fact that the lower edge of outer plate 62 is generally U-shaped as indicated at 68 so that the free edge 70 thereof is securely engaged in a channel portion 72 formed on the bottom wall 74 of the shell 56. In order to retain the shell in a perfectly horizontal position on a seat cushion which inclines downwardly and rearwardly the bottom wall 74 of shell 56 can be formed, if desired, with a foot portion 76 at the junction of the rounded wall portion 78 with the bottom wall 74.

Figures 6, 7:
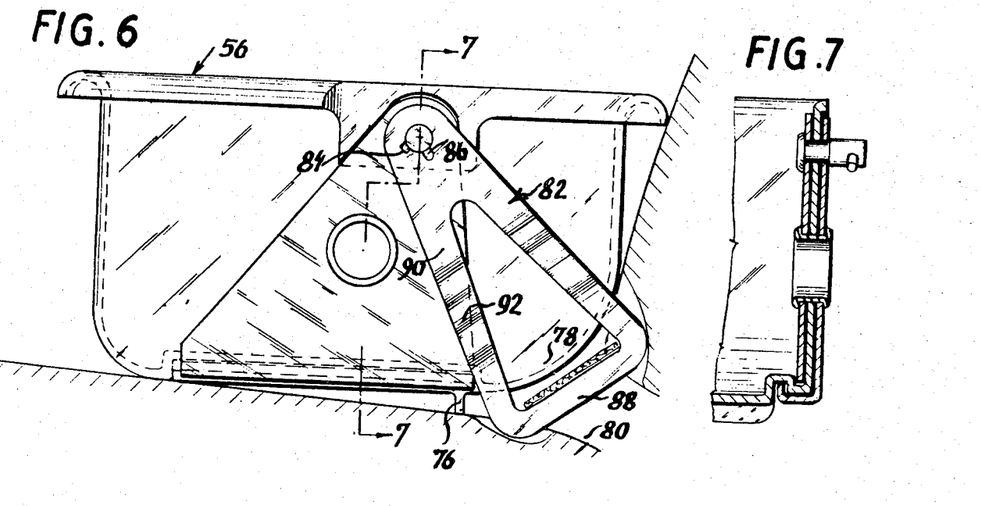
FIG. 6 is an end view of a first modified form of infant car bed according to the present invention.
FIG. 7 is a sectional view along line 7-7 in FIG. 6.

Shell 56 is designed to be secured on a vehicle seat by means of a conventional seat belt 80 by a pair of links 82, one pivotally connected to each of studs 66. To facilitate ready application and removal of links 82 to studs 66 each stud is formed with a radially projecting pin 84 and each link 82 is formed with a radially extending slot 86; this enables the links to be slipped over the end of studs 66 when slots 86 register with pins 84. Pins 84 extend in a radial direction on studs 66 so that slots 86 can never register therewith in the event of a crash where shell 56 might pivot on link 82. For example, as shown in FIG. 6, pins 84 are inclined downwardly and forwardly at an angle of about 45° whereas slots 86 in the normal position of the unit are inclined downwardly and rearwardly. In other words, in the arrangement illustrated in order to disengage links 82 from studs 66 shell 56 would have to rotate in a counterclockwise direction or links 82 would have to rotate in a clockwise direction through an angle of 70°–80° to disengage the links from the shell. While such relative rotation is possible when it is desired to intentionally engage or disengage the links with the shell, such relative rotation would never occur as a result of a collision.

Each link 82 is generally triangularly shaped with an open center portion so as to provide a bottom leg 88 to accommodate seat belt 80 and with two side legs 90 which converge from bottom legs 88 toward the opening at the upper end thereof for accommodating stud 66.

Figures 8, 9:
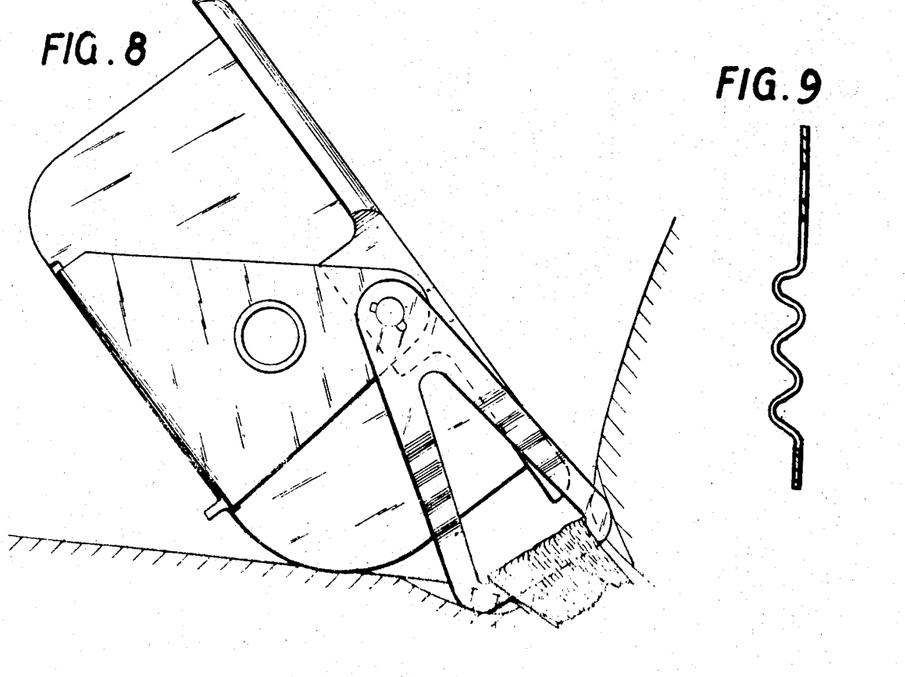
FIG. 8 is an end view of the car bed shown in FIG. 6 and showing the position it assumes in the event of a front end collision.
FIG. 9 shows a longitudinal cross section of the link that may be employed for the car bed illustrated in FIGS. 6 through 8.

Links 82 are preferably formed from sheet metal or the like and each leg 90 thereof may be corrugated as at 92 (FIG. 9). The material from which links 82 are formed and the cross sectional dimensions of legs 90 are determined such that, in the event of a sudden deceleration of the vehicle (as might occur with a front end collision), the momentum of shell 56 with the infant therein is sufficient to elongate the links 82 by at least partially straightening out the corrugations 92 so as to provide a smooth deceleration to the shell. Obviously different sets of links 82 can be provided with differing stretch resistance to adapt the unit to the stretch resistance of the seat belt and to the weight of the infant in order to obtain an optimum deceleration pattern.

As is the case with the embodiment illustrated in FIGS. 1–5, in the arrangement illustrated in FIGS. 6–9 the line of force applied to the shell by the restraining seat belt extends above the axis of the center of gravity of the unit with the infant therein so that in the event of a front end collision the unit will rotate from the position shown in FIG. 6 to that shown in FIG. 8. As explained above, this minimizes and substantially eliminates the danger of serious injury to the infant in the event of a front end collision for substantially the same reasons set forth in connection with the description of the operation of the embodiment illustrated in FIGS. 1–5 and because of the additional feature of the stretching or elongation of legs 90 of links 82, which further tends to lower the peak load of the impact.

Figure 10:
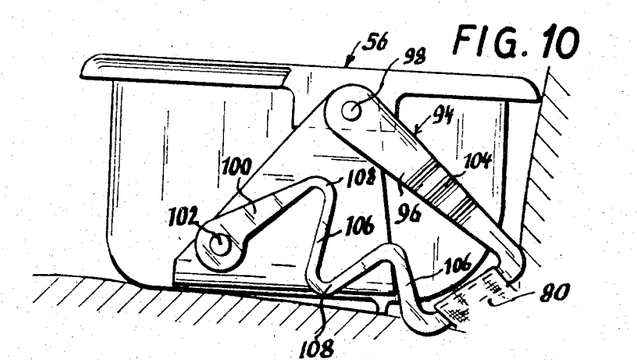
FIG. 10 is an end view of a second modified form of car bed according to the present invention.
Figures 11, 12:
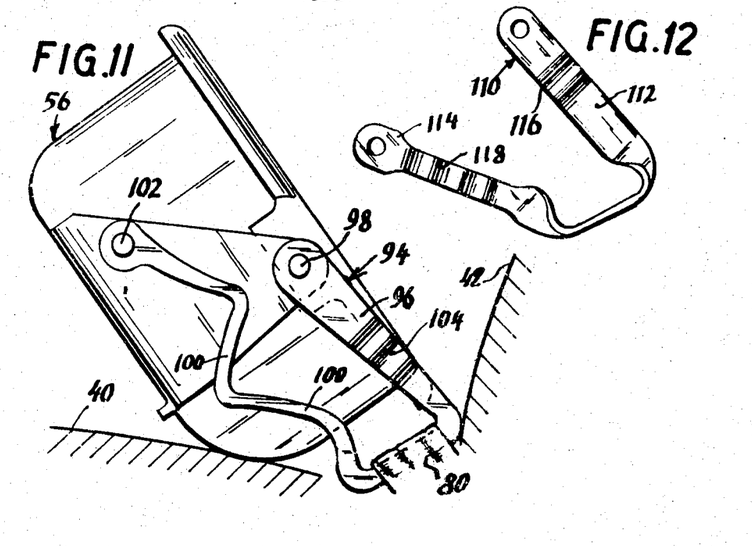
FIG. 11 shows the position assumed by the car bed illustrated in FIG. 10 in the event of an impact.
FIG. 12 is a view showing a modified form of link that may be employed on the car bed illustrated in FIGS. 10 and 11.

Referring now to FIGS. 10 and 11, the unit illustrated differs from that shown in FIGS. 6–9 only in the construction of the links 94 by means of which shell 56 is connected to seat belt 80. Each link 94 consists of a generally U-shaped member having one generally straight leg 96 pivotally connected to an end wall of the shell as at 98 adjacent the upper edge thereof and a second leg 100 of serpentine shape pivotally connected to the end wall adjacent the front lower portion thereof as at 102. Leg 96 may be provided with slight corrugations 104 therein which are similar in size and appearance to the corrugations 92 of the previously described link 82. However, the portions 106 of leg 100 which are connected by the bends 108 are relatively long so that it requires substantially less force to stretch or elongate legs 100 of each link 94 than the legs 96 thereof. Accordingly, in a rapid deceleration of the vehicle the two legs 100 of links 94 elongate or stretch first so as to permit shell 56 as a whole with the infant therein to tilt to the position shown in FIG. 11. If the momentum is sufficiently great, after legs 100 stretch or elongate, then both sets of legs 100 and 96 will tend to extend or elongate together. In any event, the tilting movement of the shell provides the same safety features for the infant lying therein as explained in connection with the previous embodiments illustrated.

A further modification of the link construction which may be employed for interconnecting the unit with a seat belt is shown in FIG. 12. This link (generally designated 110) likewise has two legs 112,114 which are secured to the end panels of shell 56 in the same manner as illustrated in FIGS. 10 and 11. Link 110, however, differs from link 94 in that leg 112 is preferably wider and has less corrugations 116 therein than leg 114. Thus, as shown in FIG. 12, leg 114 is substantially narrower than leg 112 and has about twice as many corrugations 118 therein. When links of the type illustrated in FIG. 12 are employed the force of deceleration will cause leg 114 to elongate more readily than leg 112 and, thus, the shell will still be permitted to assume the position shown in FIG. 11 in the event of a sudden impact.

It will be appreciated that many other link constructions can be provided to enable the shell to pivot from the position shown in FIG. 10 to the position shown in FIG. 11. In effect the two legs of these links simply have different rates of plastic deformation. In this connection it will be appreciated tat the links (either of the type shown in FIGS. 6–9 or the type shown in FIGS. 10–12) need not be the same at each end of the shell. For example, if the link at the end of the shell corresponding to the position of the infant's head were permitted to stretch or elongate less readily than the link at the end of the shell corresponding to the infant's feet, it is possible in the event of an impact to direct the position of the infant's head so that it would be pressed against the padding with much less force than would otherwise be the case. The mass of an infant's head is greater than the mass of an infant's legs. Thus, if the link at the head end of the unit were stronger than the link at the foot end of the unit, in the event of an impact the unit would still rotate to the tilted position but the weaker link at the foot end of the device would permit the foot end to travel further than the head end and, thus, minimize the impact force on the infant's head.

The use of the stretchable or deformable links is desirable to minimize the peak load of the deceleration and to compensate for the substantially different masses of the infant's body at the head and foot ends thereof. Also the deformation of such links can compensate for the use of an adult type safety belt to restrain the device inasmuch as an adult type belt may not stretch sufficiently under the substantially lower loads of the infant. The stretching of the seat belt is desirable in any event in order to lower as much as possible the peak deceleration rate.

Figures 13, 14, 15, 16, 17:
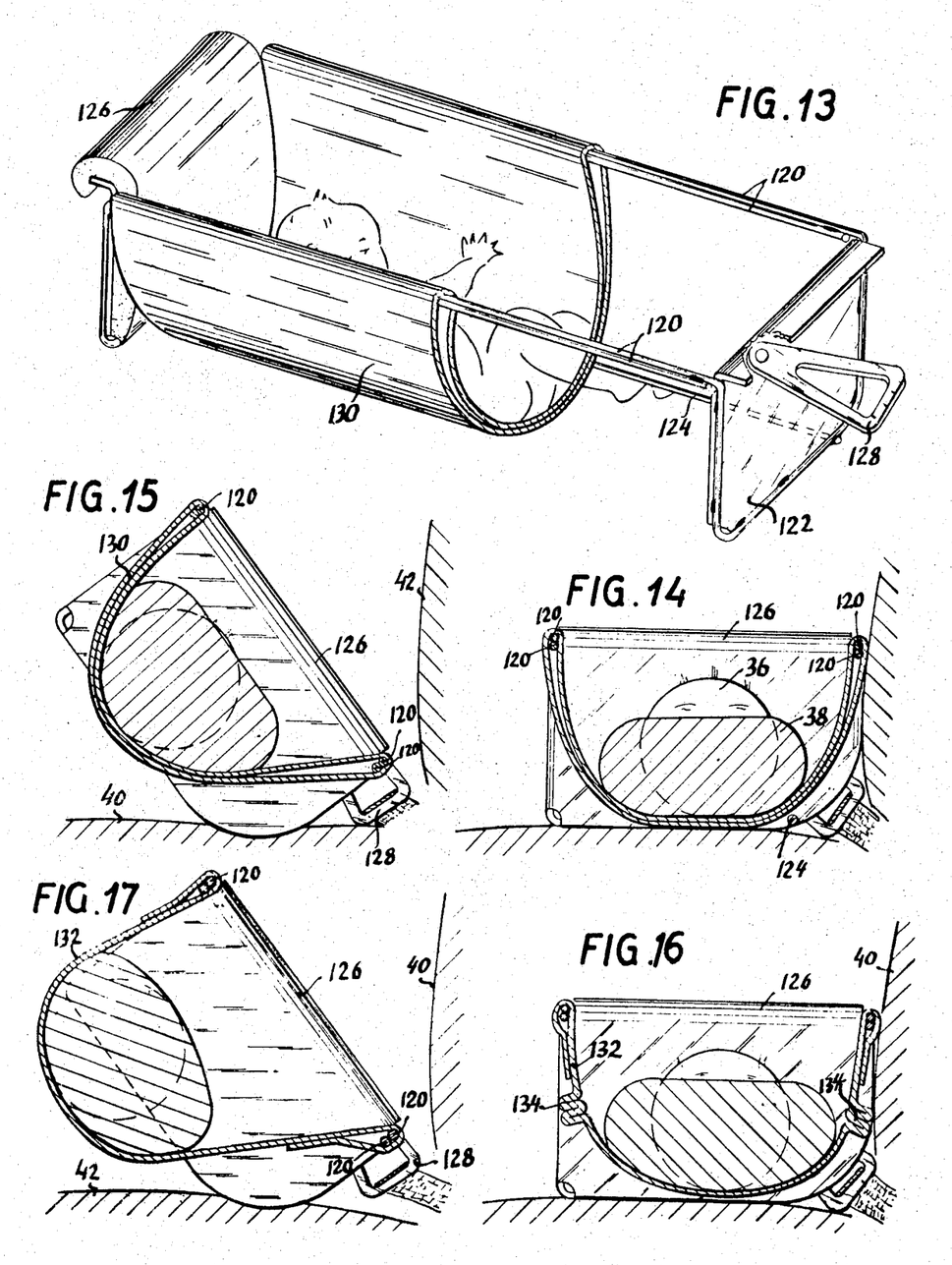
FIG. 13 is a perspective view, with parts broken away, of a third modified form of car bed according to the present invention.
FIG. 14 is a cross sectional view showing the car bed illustrated in FIG. 13 secured to a vehicle seat.
FIG. 15 shows the position assumed by the car bed illustrated in FIGS. 13 and 14 in the event of an impact.
FIG. 16 is a cross sectional view of a fourth modified form of car bed according to the present invention.
FIG. 17 shows the position assumed by the car bed illustrated in FIG. 16 in the event of an impact.

In the embodiments illustrated in FIGS. 13–16 the device consists essentially of a relatively rigid frame consisting of longitudinally extending rods 120 along the front and rear sides thereof securely attached to rigid end panels 122. Rods 120 extend between and connect the upper ends of panels 122. An additional support rod 124 may be employed to interconnect the lower rear portions of end panels 122. End panels 122 are covered with a suitable padding 126 to protect the infant's head, feet and body in the event of an impact against the side of the vehicle. The units shown in FIGS. 13–16 are adapted to be secured to a vehicle seat by links 128 which are similar in construction and function to links 82 shown in FIGS. 6–9. The infant is actually supported in a hammock-like panel 30 which is looped around the rods 120. Panel 130 is formed from flexible sheet material, such as fabric, plastic, etc. The normal position of the unit as secured to a vehicle seat is shown in FIG. 14. In the event of an impact the rigid frame, consisting essentially of rods 120 and end panels 122, tilts or rocks to the position shown in FIG. 15 and at the same time panel 130 is swung forwardly and upwardly about rods 120 as shown in FIG. 15. These combined movements minimize the impact force on the infant.

In FIGS. 16 and 17 the unit there illustrated is substantially the same as that shown in FIGS. 13–15 except that the flexible hammock-like support 132 is formed with a plurality of folds 134 on the front and rear walls thereof, which folds are either cemented, sewn, stapled or otherwise secured together in a releasable fashion so that in the event of a collision the means securing the folds together release the folds thus permitting them to straighten out and thereby consume some of the impact energy and also reduce the peak load of the inertia forces.

With the arrangement shown in FIGS. 13–16 the infant's entire body is craddled in the hammock-like support and, since this support is readily flexible and distortable, in the event of a crash the whole unit tilts as shown in FIGS. 15 and 17 but, in addition thereto, the hammock-like support for the infant's entire body is still retained. Thus the whole body of the infant, including its head, is supported by a relatively large area and the infant's neck is not unduly strained or bent as a result of an impact.

Figure 1:
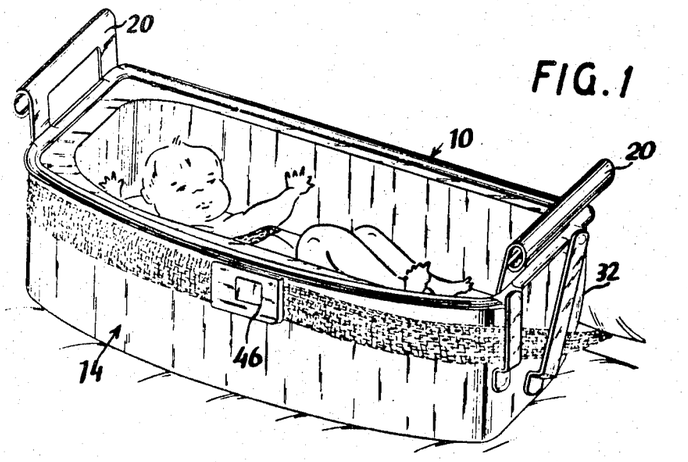
FIG. 1 is a perspective view of one form of car bed of the present invention secured to a vehicle seat.
Figure 2:
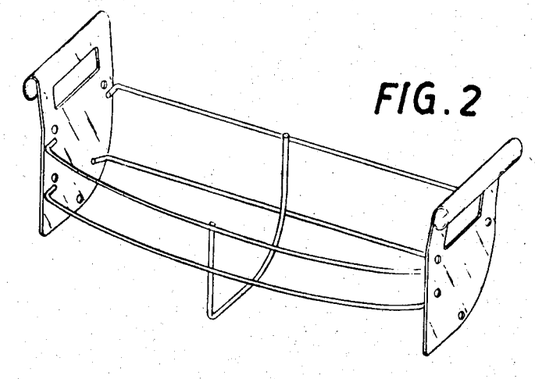
FIG. 2 is a perspective view of the generally rigid frame structure of the car bed shown in FIG. 1.

While the use of a belt or strap for restraining the infant within the car bed is shown only in connection with FIG. 1 (as at 54), it will be appreciated that the use of such restraining belt or strap within the unit itself is desirable since it confines the infant to a localized position within the enclosure; it also protects the infant in the event that the vehicle rolls over. It will also be appreciated that a suitable form of netting or the like can be employed to extend over the open end of the device in a conventional manner and thus provide an additional safety factor, particularly in the event that the vehicle should roll over.

It will be appreciated that in any restraining device for use in vehicles the severity of an injury to an infant resulting from impact of portions of the infant's body against the restraining device depends largely upon the peak load applied as a result of the impact, the duration of such impact load and the size of the impacted area. In each of the embodiments illustrated herein the infant restraining device is so designed as to tilt the infant's body during impact. By tilting the infant's body during impact the location of the peak load of impact shifts over a larger area of the infant's body and with this shifting the duration of the peak load over a specific small area is shortened. Likewise, the tilting action is such that for at least a portion of the time during impact a relatively large portion of the body is restrained by the restraining means, thus also reducing the specific load on the infant's body.

I claim:

1. An infant car bed for use on a vehicle seat comprising a walled enclosure open at its upper end to permit positioning of an infant therein and including a generally rigid, shape-retaining frame on which the walls of the enclosure are supported, said enclosure having a bottom wall on which an infant is adapted to be supported in an reclined position extending lengthwise thereof, an end wall at each end of the enclosure and a side wall extending between said end walls and connected at its lower end with said bottom wall, said frame including generally rigid top, bottom and rear portions, said frame portions being rigidly connected together so as to be generally immovable relative to one another in the event of sudden deceleration of the vehicle, at least the upper portion of said side wall being connected directly to said top frame portion so that it is constrained to move bodily therewith, said car bed being adapted to be positioned on a vehicle seat extending transversely of the direction of travel of the vehicle with said bottom frame portion positioned on the vehicle seat cushion, the rear frame portion positioned against the seat back and said side wall facing forwardly to thereby limit the forward displacement of an infant relative to the vehicle in the event of sudden deceleration of the vehicle, attachment means on said frame connected with upwardly and forwardly extending restraining belt means anchored on the vehicle for securing the car bed on the vehicle seat as described, said attachment means being connected with said frame at a location spaced above the center of gravity of the car bed as a whole with an infant therein so that upon sudden deceleration of the vehicle the force exerted by said restraining belt means on the connection between the attachment means and said frame extends along a line which passes above the center of gravity of the infant-occupied car bed whereby, upon sudden deceleration of the vehicle, the frame and the enclosure tend to rotatably skid as a unit on a seat cushion about said center of gravity as an axis while the latter is displaced forwardly and thereby tilting said frame and enclosure in a direction such that the bottom wall and the bottom frame portions are displaced forwardly in an arcuate path to a position inclined forwardly and upwardly while said forwardly facing wall and the adjacent top frame portion are simultaneously displaced in an arcuate path to a position where the forwardly facing wall is inclined upwardly and rearwardly and said connection between the attachment means and frame moves rearwardly relative to the path of travel of said center of gravity whereby the infant within the enclosure revolves upwardly and forwardly with said frame and said bottom and side walls as they tilt in the manner described.

2. A car bed as called for in claim 1 wherein the enclosure is also provided with a rear wall extending upwardly from the rear edge portion of the bottom wall.

3. A car bed as called for in claim 1 wherein said attachment means comprise brackets mounted on said frame adjacent the upper portion thereof, said brackets being adapted to be interengaged with a conventional seat belt.

4. A car bed as called for in claim 3 wherein said walls are interconnected in a generally rigid relation and said brackets are mounted on said frame so that the restraining force on the seat belt causes the enclosure as a whole to tilt when it is subjected to sudden deceleration so that said bottom wall and said forwardly facing wall assume said tilted positions as described.

5. A car bed as called for in claim 4 wherein the rear lower corners of the end walls are of rounded contour to facilitate said tilting movement of the enclosure.

6. A car bed as called for in claim 1 wherein said attachment means comprise link means mounted on opposite ends of the frame.

7. A car bed as called for in claim 6 wherein said link means are formed with bends therein which tend to straighten out and thereby elongate the links when the bed is subjected to a sudden deceleration to thereby at least partially absorb the energy developed by said deceleration.

8. A car bed as called for in claim 7 wherein the link means at one end of the enclosure is designed to resist elongation to a greater extent than the link means at the opposite ends of the enclosure.

9. A car bed as called for in claim 6 wherein said link means are pivotally connected to said frame at each end thereof.

10. A car bed as called for in claim 6 wherein each link means includes a pair of legs interconnected at one end and having their free ends connected to an end wall of the enclosure at spaced apart points, at least one leg of each link means being bent transversely of its length so that upon sudden deceleration of the enclosure the bent portions tend to straighten out and thereby assist in enabling the enclosure to assume said tilted position.

11. A car bed as called for in claim 6 wherein both legs of said link means tend to elongate when the enclosure is subjected to sudden deceleration.

12. A car bed as called for in claim 11 wherein one leg of each link means is designed to resist elongation to a greater extent than the other leg thereof.

13. A car bed as called for in claim 1 wherein said rigid frame includes a pair of support rods extending between opposite ends of the frame adjacent the upper front and rear sides thereof, a panel of flexible sheet material suspended on said rods and defining front, rear and bottom walls of the enclosure, said sheet material forming a hammock-like support for the infant which is swingable about said support rods in a forwardly and upwardly direction with the infant therein in response to a sudden deceleration of the vehicle.

14. A car bed as called for in claim 13 wherein said flexible panel has fold means therein comprising overlapping pleats extending lengthwise of the enclosure, releasable means for retaining said last-mentioned panel in a folded condition and means responsive to a sudden deceleration of the enclosure for causing the forward momentum of the infant to release said fold retaining means to thereby increase the effective width of the panel and thereby cause the releasable means to absorb some of the energy resulting from said sudden deceleration.

15. A car bed as called for in claim 1 wherein the vertical distance between the connection between the attachment means and the frame and the bottom frame portion is less than the distance between said connection and said bottom frame portion at a point rearwardly of said connection whereby said bottom frame portion causes the vehicle seat cushion to compress to enable the frame to rotatably skid as described on the seat cushion about said center of gravity as an axis.

16. A car bed as called for in claim 1 wherein the vertical distance between the connection between the attachment means and the frame and the bottom frame portion is less than the horizontal distance between said connection and the rearmost portion of said rear frame portion whereby said rear frame portion causes the vehicle seat back to compress to enable the frame to rotatably skid as described on the seat cushion about said center of gravity as an axis.

* * * * *

PO-1050
(5/69)

UNITED STATES PATENT OFFICE
CERTIFICATE OF CORRECTION

Patent No. 3,833,946      Dated September 10, 1974

Inventor(s) Heinrich F. Von Wimmersperg

It is certified that error appears in the above-identified patent and that said Letters Patent are hereby corrected as shown below:

Column 9, Line 6   Cancel "6" and insert -- 10 --

Signed and sealed this 24th day of December 1974.

(SEAL)
Attest:

McCOY M. GIBSON JR.
Attesting Officer

C. MARSHALL DANN
Commissioner of Patents